United States Patent [19]

Blincow et al.

[11] 4,356,874
[45] Nov. 2, 1982

[54] WEIGHT CONTROLLER FOR CANNED FOOD AND THE LIKE

[75] Inventors: Donald W. Blincow, Claremont; Robert G. Parks, Covina, both of Calif.

[73] Assignee: General Nucleonics, Inc., Pomona, Calif.

[21] Appl. No.: 199,001

[22] Filed: Oct. 20, 1980

[51] Int. Cl.³ .................. G01G 3/14; G01G 19/00; G01N 23/00
[52] U.S. Cl. .............................. 177/210 FP; 177/145; 250/358.1
[58] Field of Search ............. 177/145, 210 FP, 210 R; 250/358 R, 359, 360

[56] References Cited

U.S. PATENT DOCUMENTS 3,326,309  6/1967  Swearengen .............. 177/145 X
3,519,093  7/1970  Ramsay .................... 177/210 FP X
3,757,122  9/1973  Bossen et al. ................ 250/358
3,955,665  5/1976  Pettis, Jr. et al. .......... 177/145 X

FOREIGN PATENT DOCUMENTS 2040479  8/1980  United Kingdom ........... 177/145

Primary Examiner—Geroge H. Miller, Jr.

[57] ABSTRACT

Apparatus for determining weight of a container moving along a path past a weighing zone with radioactive source and detector mounted on opposite sides of the path for directing a radiation beam through the container passing through the weighing zone. Counters for counting radiation detector output pulses and reference timing pulses, with position sensors providing a gating for the counters so as to count when a container is moving past the radiation beam. The quotient of the two counts provides a measure of weight of a container.

5 Claims, 3 Drawing Figures

WEIGHT CONTROLLER FOR CANNED FOOD AND THE LIKE

BACKGROUND OF THE INVENTION

This invention relates to measurement of the contents of a container, typically a can of food at a packing plant, which measurement can be carried out before or after liquid is added to the container and before or after the lid is put on the container. The invention is particularly directed to a radioactive type measurement which can be performed on individual containers as they are moved along on a conveyor, without requiring stopping of containers and without requiring contact with the container. The weight measurement can be utilized for comparison with a standard to reject improperly filled containers, and can be used to record and/or display weight data on individual containers and for calculating totals, averages and other data as desired.

It is an object of the invention to provide a new and improved container measuring system of the radioactive type which can be added to an existing conveyor line without requiring attachments or changes in the line. A further object is to provide such a measuring apparatus which can perform the weight measurement while the containers are in motion without stopping or slowing the containers and without requiring contact with the containers.

It is a particular object of the invention to provide a new and improved weight measuring system incorporating a timing operation for making the measurement while a can is at the measuring zone, with the timing being controlled by the can itself. A further object is to provide such an apparatus which will give an accurate weight measurement despite variation in speed of the conveyor system moving the cans past the weighing zone. An additional object is to provide such an apparatus which is readily adapted for use with containers of various sizes and for use with containers calling for various types of contents and various amounts of fill.

Other objects, advantages, features and results will more fully appear in the course of the following description.

SUMMARY OF THE INVENTION

The present invention includes an apparatus for determining weight of a container moving along a path past a weighing zone. The apparatus provides an accurate measurement while the speed of movement of containers varies. The apparatus also is readily adapted for use with containers of various sizes and for containers with various types and amounts of fill.

The apparatus includes a radioactive source and a radiation detector mounted on opposite sides of the path at the weighing zone for directing radiation from the source to the detector through a container moving through the weighing zone. Pulses from the radiation detector are counted for a period of time controlled by the container. Pulses from oscillator or other pulse source are also counted for the same time and these two pulse counts are divided to produce a quotient which is a measure of the weight of the container. The time for operation of the counters is determined by the movement of the container past the source and detector, as by having first and second sensors one of which provides an on or start signal for the counters and the other which provides an off or stop signal for the counters.

The quotient may be converted to a weight figure by computation with calibration data. The quotient or the weight figure can be compared with a standard to determine if the can weight is within preset limits. When a can is outside the limits, as by being underweight, a reject signal can be generated to actuate a reject mechanism. Also, the can weight information can be displayed and/or recorded for viewing by an operator, and can be stored and utilized in averaging and/or totalling calculations as desired. The average can weight data can be used to generate a signal to control the can fill operation to obtain more uniform fill weights.

DESCRIPTION OF THE PREFERRED EMBODIMENT

Figure 1:
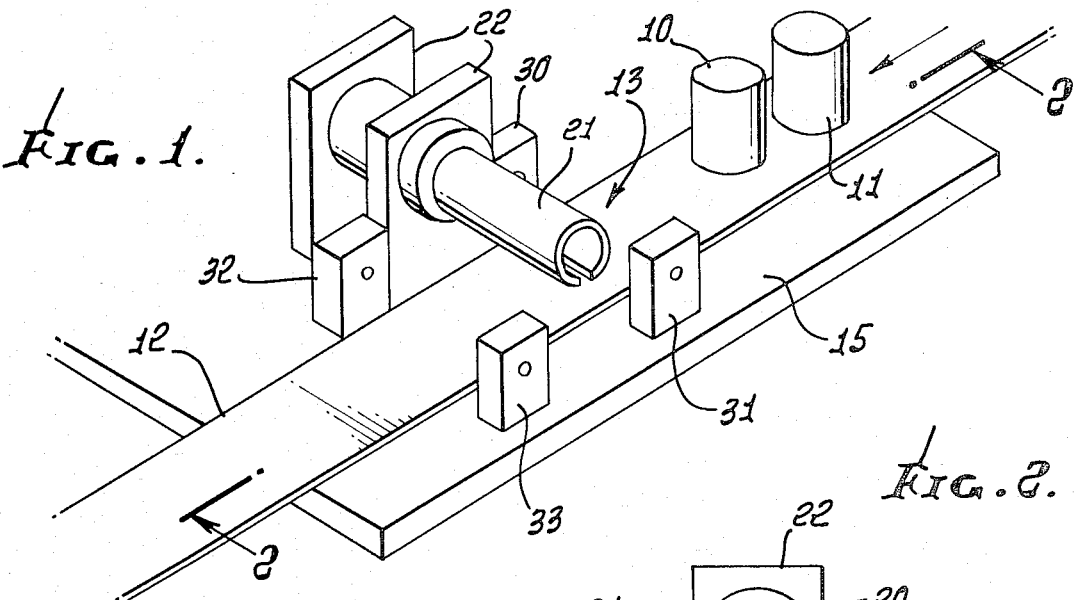
FIG. 1 is a perspective view of a container conveyor with a weighing apparatus incorporating the presently preferred embodiment of the invention.
Figure 2:
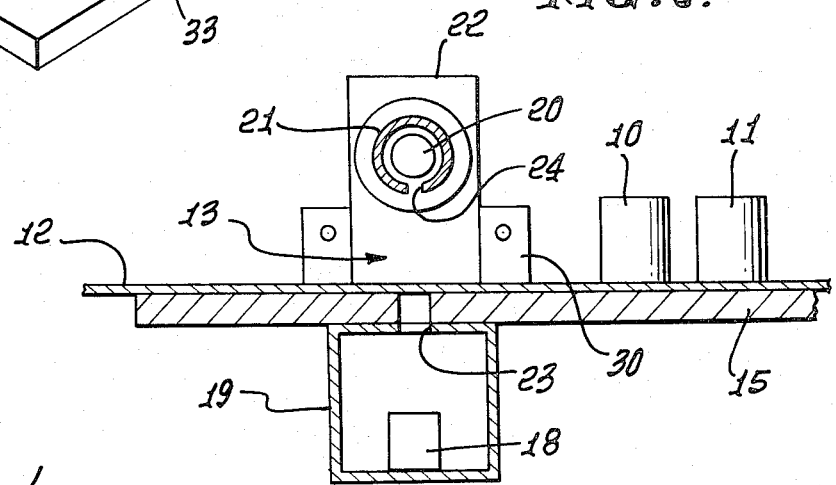
FIG. 2 is a sectional view taken along the line 2—2 of FIG. 1.

Referring to FIGS. 1 and 2, cans 10, 11 are moved on a conveyor belt 12 past a weighing zone 13. The components of the weighing apparatus may be mounted on a plate 15, with the conveyor belt 12 moving along the upper surface of the plate. The belt may contact the plate or be spaced upward from the plate as desired. A radioactive source 18 is mounted in a housing 19 on the underside of the plate 15, and a radiation detector 20 is carried in a housing 21 mounted on brackets 22 supported by the plate 15.

The radioactive source 18 may be a conventional source, such as Americium 241, Krypton 85 or other gamma emitter or an x-ray tube.

The radiation sensor 20 may also be conventional and typically is a scintillation detector. The source and detector are mounted opposite each other so that the cans pass therebetween. The source can be below and a detector above as shown in FIGS. 1 and 2, or the positions can be reversed, or the source and detector can be positioned on opposite sides of the cans. A collimating slit 23 is provided in the housing 19 and plate 15 so as to direct a beam from the source to the detector at a right angle to the direction of can motion. A similar collimating slit 24 is provided in the housing 21. With this configuration, the radiation beam sweeps a section of the cans contents as the can passes through the beam.

Means are provided for indicating when a can is in the radiation path and in the embodiment illustrated, two position sensors are utilized. A light source in a housing 30 directs a light beam to a photocell in another housing 31 to provide a first position sensor upstream of the radiation beam. Another light source in another housing 32 directs a light beam to another photocell in another housing 33 to provide a second position sensor downstream of the radiation beam. Other types of can position sensing devices can be utilized, such as beta sources or low energy photon sources and radiation detectors, or even mechanical position detectors. The position sensors look across the conveyor belt above the belt surface to provide signals identifying the time period that a can is crossing the radioactive beam field of view. These position sensors provide on and off signals for the electronic portion of the apparatus. In one mode of operation, an on signal can be provided when a can breaks the beam at the first position sensor and an off signal provided when the can breaks the beam at the second position sensor. In an alternative mode of operation, an on signal can be provided when the can breaks the beam at the second position sensor and an off signal provided when the can moves out of the beam at the first position sensor.

Figure 3:
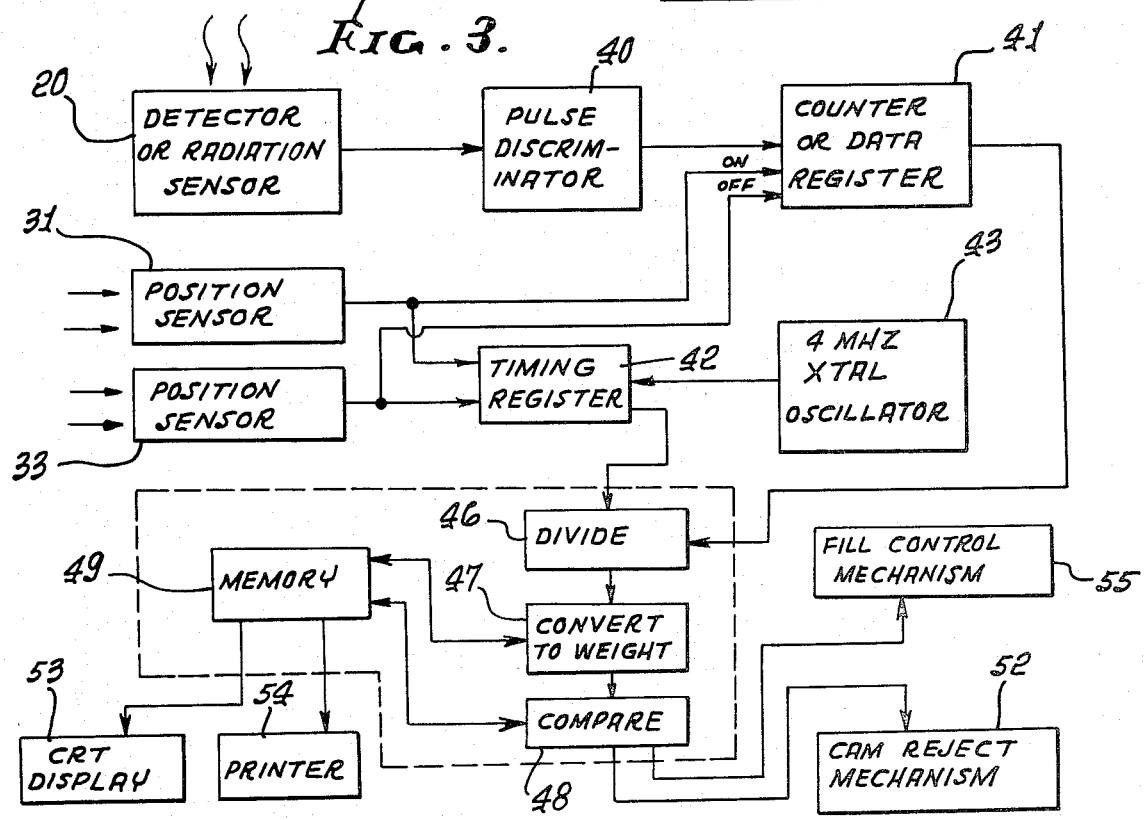
FIG. 3 is a block diagram illustrating the electrical circuitry for the apparatus of FIG. 1.

Referring to FIG. 3, the apparatus also includes a pulse discriminator 40, a counter or data register 41, a timing register 42, and an oscillator 43. The apparatus further includes a divide unit 46 which may be operated in conjunction with a converter 47, a comparator 48, and a memory 49. These components 46–49 may be provided separately or may be incorporated in a microprocessor 50 indicated by the dashed lines. A can reject mechanism 52, a can filling control mechanism 55, a cathode ray tube display 53, and a printer 54 may also be utilized if desired.

In operation, the pulses from the radiation detector are connected as input to the pulse discrimator which is a conventional circuit providing as an output, pulses corresponding to input pulses of a predetermined energy level, ordinarily rejecting pulses of energy levels outside the range of interest for a particular apparatus, typically the energy level band of the radioactive source used in the apparatus.

The pulse discrimator output is connected as an input to the counter 41. The output from the oscillator 43 is connected as an input to the counter or timing register 42. The oscillator provides a continuous pulse train and in the embodiment illustrated, is a crystal controlled oscillator operating at four megahertz. The position sensors 31, 33 provide on and off control pulses to the counters 41, 42. With this configuration, the number of pulses counted in the register 42 is a measure of the time used in accummulating the count in the register 41, this time being that when the radiation beam from the source to the detector is within the can being measured. The number of signal pulses or counts in the register 41 is divided by the number of pulses or counts in the register 42 in the divide unit 46, providing an output which is a measure of the weight of the can, independent of variations in speed of the can as it moves past the weighing zone.

The quotient obtained by this dividing operation is a number providing a direct indication of the weight of the can. However it is preferable to have a weight figure in ounces or grams, and the quotient is converted to the desired units, as by multiplication by a calibration constant stored in memory 49, which constant may be determined for each cans size. The weight of each can may be compared with a limit, such as a minimum weight, stored in memory 49, with the comparison being accomplished in the comparison unit 48. If it is indicated that the weight is below the minimum, a can reject signal is delivered to the can reject mechanism which may physically remove the can from the conveyor or mark a can for subsequent removal or modification. Also, the weight of each can may be immediately displayed and/or recorded at the CRT display 53 and printer 54, for viewing by an operator. Also, the can weights may be stored in memory and average weights for a preselected number of cans computed and daily or hourly total weights computed, as desired. The number and/or percent of cans above and below limits may also be computed. These figures may also be displayed or printed out or used for control, as desired. The average weight data can be compared with upper and lower weight limits to provide an input to the can filling mechanisms to cause the mechanism to increase the contents whenever the average drops below a certain weight limit and to decrease the contents whenever the average exceeds another weight limit. It is readily understood that other information such as percentage of cans over or under limits, mean weights and other statistical data may be obtained.

The apparatus will operate to measure the contents of the container, whether dry or "drain weight" or with liquid added. Also, the apparatus will provide a measure either before or after a cover or lid is in place.

We claim:

1. In an apparatus for determining weight of a container moving along a path past a weighing zone, the combination of:
    a radioactive source;
    a radiation detector;
    means for mounting said source and detector at said weighing zone on opposite sides of said path for directing radiation along an axis from said source to said detector through a container moving through said weighing zone;
    pulse discriminator means having the output of said radiation detector as an input and producing as an output, pulses corresponding to input pulses of a predetermined energy range;
    a first counter for counting pulses and having the output of said pulse discriminator means as an input;
    an oscillator providing a train of timing pulses as an output;
    a second counter for counting pulses and having said oscillator output as an input;
    means for turning said first and second counters on while a container is at said weighing zone to provide first and second counts as outputs, said means for turning on said first and second counters including first and second position sensing means spaced from each other on opposite sides of said axis along said path at said weighing zone, with one of said position sensing means providing an on signal for starting said counters and the other of said position sensing means providing an off signal for stopping said counters; and
    divider means having the outputs of said counters as inputs and providing the quotient as an output as a measure of the weight of the container, so that said weight determination is independent of the velocity of the container past said source and detector.

2. An apparatus as defined in claim 1 including:
    converter means for converting said quotient to an actual weight figure;
    memory means for storing a reference weight figure; and
    comparison means for comparing said actual weight figure and said reference weight figure and providing a reject output signal when said actual weight figure is less than said reference weight figure.

3. An apparatus as defined in claim 1 including:
    means for computing average weight of a predetermined number of containers; and
    means for displaying the computed data.

4. An apparatus as defined in claim 3 including means for comparing computed average weight and weight limits and providing a fill change output signal when a limit is exceeded.

5. In an apparatus for determining weight of a container moving along a path past a weighing zone, the combination of:
a radioactive source;
a radiation detector;
means for mounting said source and detector at said weighing zone on opposite sides of said path for directing radiation along an axis from said source to said detector through a container moving through said weighing zone;
a first counter for counting pulses from said radiation detector;
means for turning said first counter on while a container is at said weighing zone to provide a first count as an output, said means for turning on said first counter including first and second position sensing means spaced from each other on opposite sides of said axis along said path at said weighing zone, with one of said position sensing means providing an on signal for starting said counter and the other of said position sensing means providing an off signal for stopping said counter;
a second counter for counting timing pulses while said first counter is counting, to provide a second count as an output; and
divider means having said first and second counts as inputs and providing the quotient as an output as a measure of the weight of the container, so that said weight determination is independent of the velocity of the container past said source and detector.

* * * * *